United States Patent [19]

Kuster et al.

[11] Patent Number: 4,851,026

[45] Date of Patent: Jul. 25, 1989

[54] BEARING UNIT FOR CARRYING ROLLERS OF A HORIZONTAL FURNACE AND A HORIZONTAL FURNACE FOR GLASS SHEETS

[75] Inventors: Hans-Werner Kuster, Aachen, Fed. Rep. of Germany; Herbert Radermacher, B-Raeren; Luc Vanaschen, Eupen, both of Belgium; Gerhard Schubert, Herzogenrath, Fed. Rep. of Germany

[73] Assignee: Saint Gobain Vitrage, Courbevoie, France

[21] Appl. No.: 251,257

[22] Filed: Sep. 30, 1988

[30] Foreign Application Priority Data

Oct. 1, 1987 [DE] Fed. Rep. of Germany ....... 3733201

[51] Int. Cl.$^4$ .................. C03B 35/18; F16C 17/06
[52] U.S. Cl. ............................. 65/273; 65/287; 65/350
[58] Field of Search ............... 384/145, 2, 134, 114, 384/116, 117, 119; 65/350, 287, 273

[56] References Cited

U.S. PATENT DOCUMENTS

| | | | |
|---|---|---|---|
| 2,125,446 | 8/1938 | Hurtt | 384/134 |
| 3,058,785 | 10/1962 | Steele | 384/114 |
| 3,672,861 | 6/1972 | Ritter, Jr. et al. | 65/350 |
| 4,139,244 | 2/1979 | Guerguerian | 384/116 |
| 4,226,608 | 10/1980 | McKelvey | 65/273 |
| 4,341,546 | 7/1982 | Nitschke et al. | 65/350 X |
| 4,647,227 | 3/1987 | Clebant | 384/119 X |
| 4,723,983 | 2/1988 | Erdmann et al. | 65/273 X |

FOREIGN PATENT DOCUMENTS

| | | | |
|---|---|---|---|
| 3310357 | 9/1984 | Fed. Rep. of Germany | 65/273 |
| 1458619 | 11/1966 | France | 384/114 |

Primary Examiner—Arthur Kellogg
Attorney, Agent, or Firm—Oblon, Spivak, McClelland, Maier & Neustadt

[57] ABSTRACT

A gas static bearing unit for carrying rollers which is suitable as a heat-resistant bearing inside a horizontal furnace for glass sheets. The bearing unit consists of a bearing 1 which automatically adapts to the orientation of the section of roller 27 mounted in the bearing 1 and which rests on two pins 8, 9 each having a spherical head 16, 17 as a support surface. The first spherical head 17 is mounted stationarily and oscillatingly, and the second spherical head 16 is mounted on a planar base 23 to allow pivoting and sliding around the stationary pin 9. A system of bores 30, 31, 32, 33 makes it possible to supply the rotating clearance with compressed air.

14 Claims, 6 Drawing Sheets

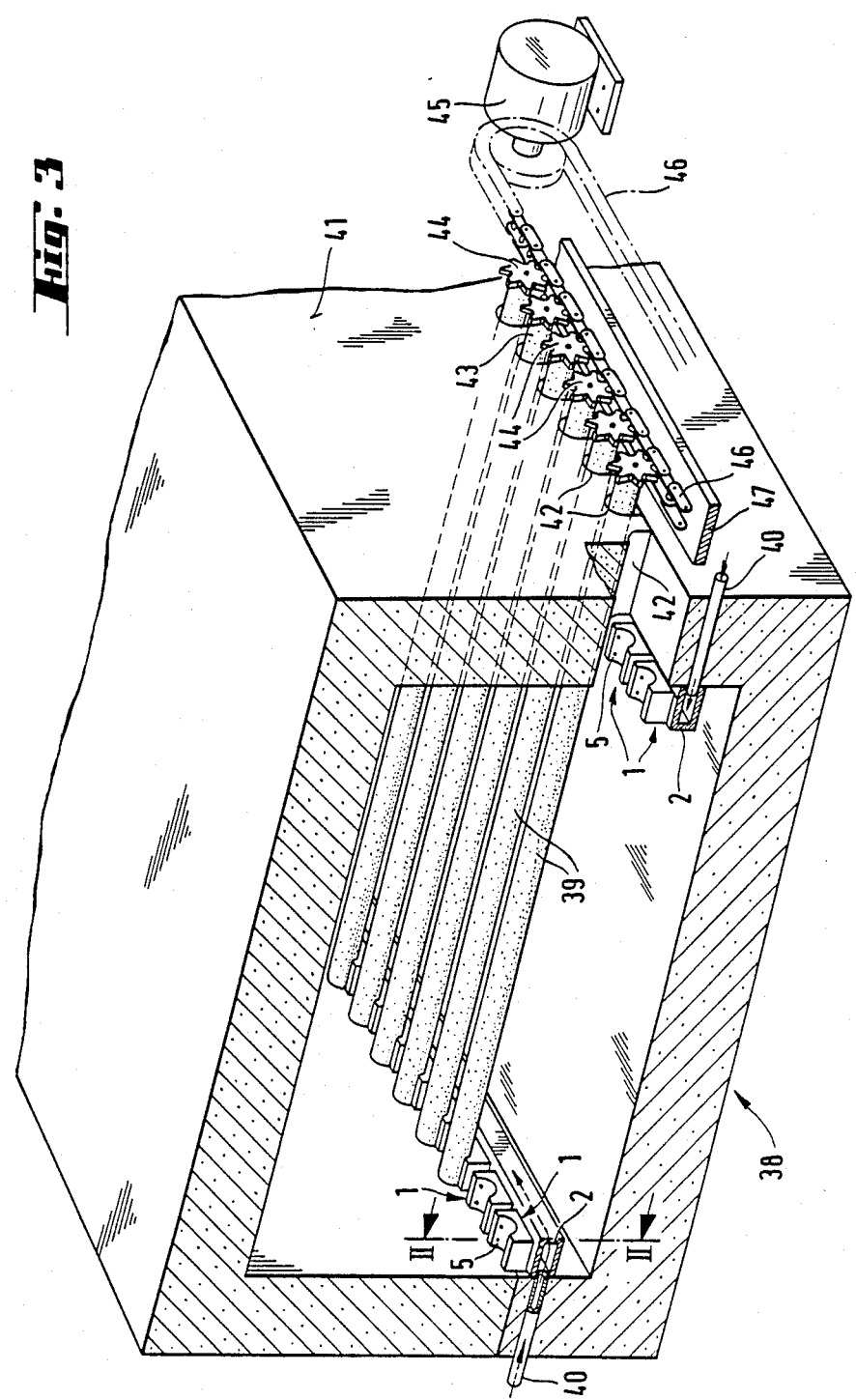

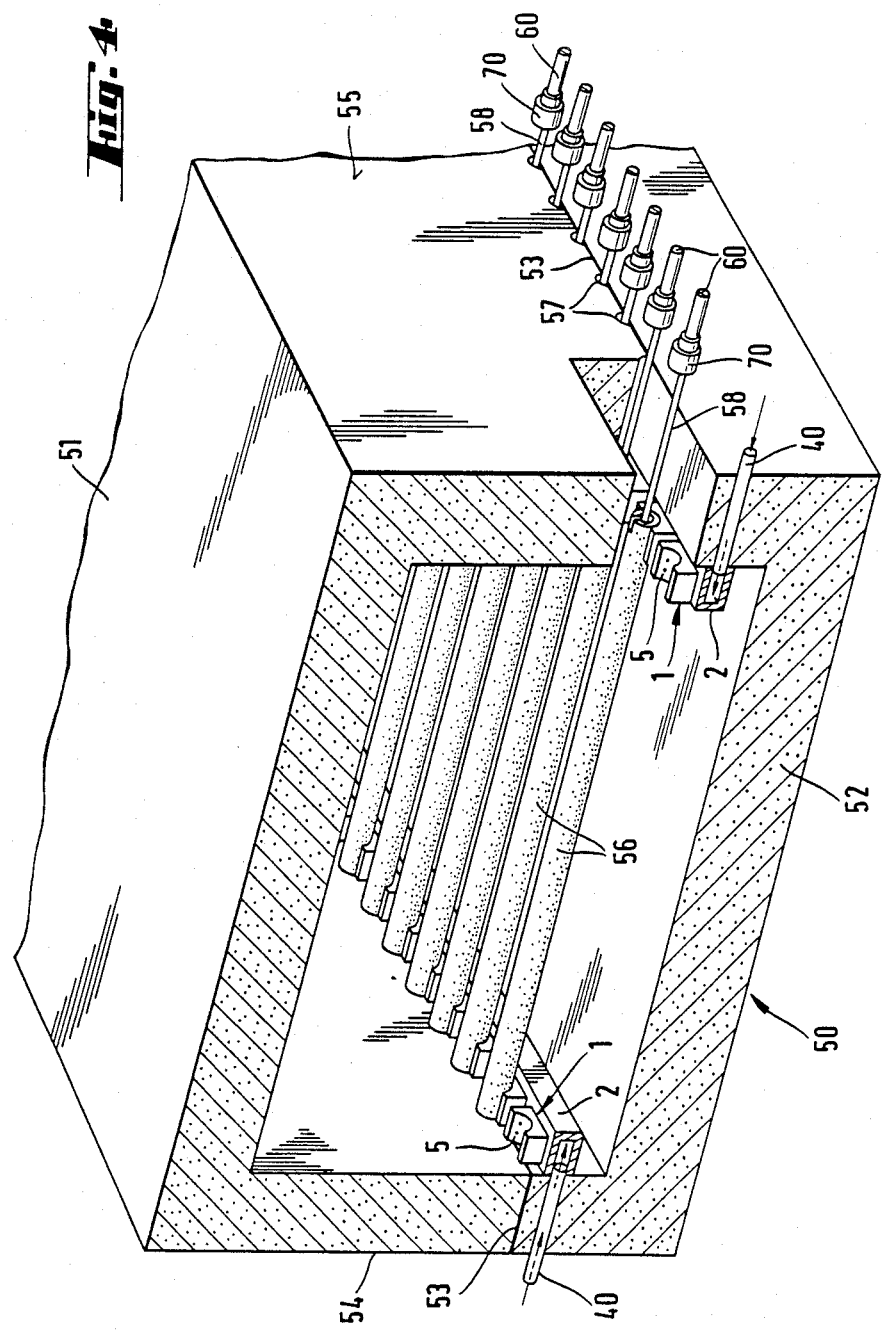

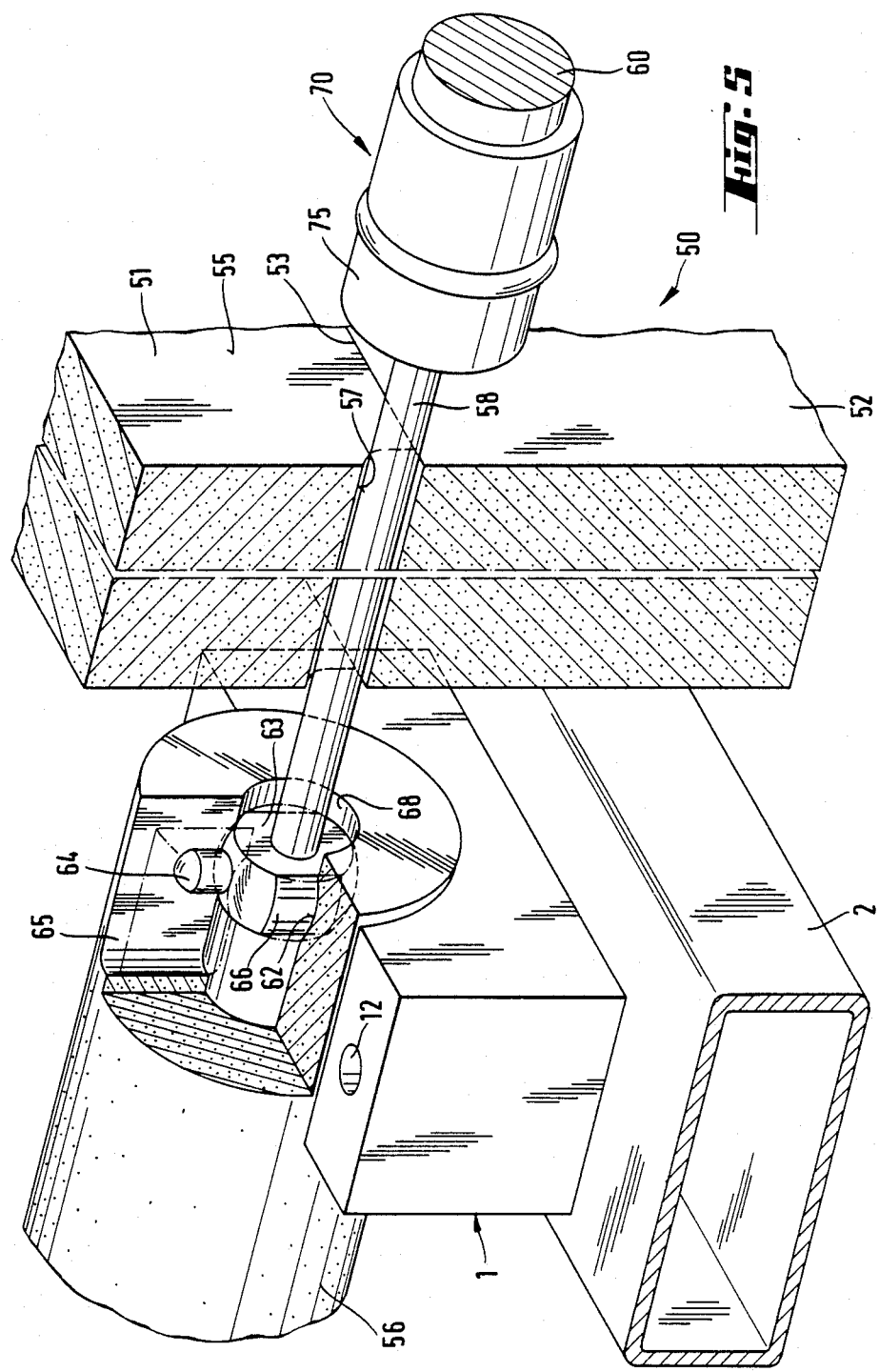

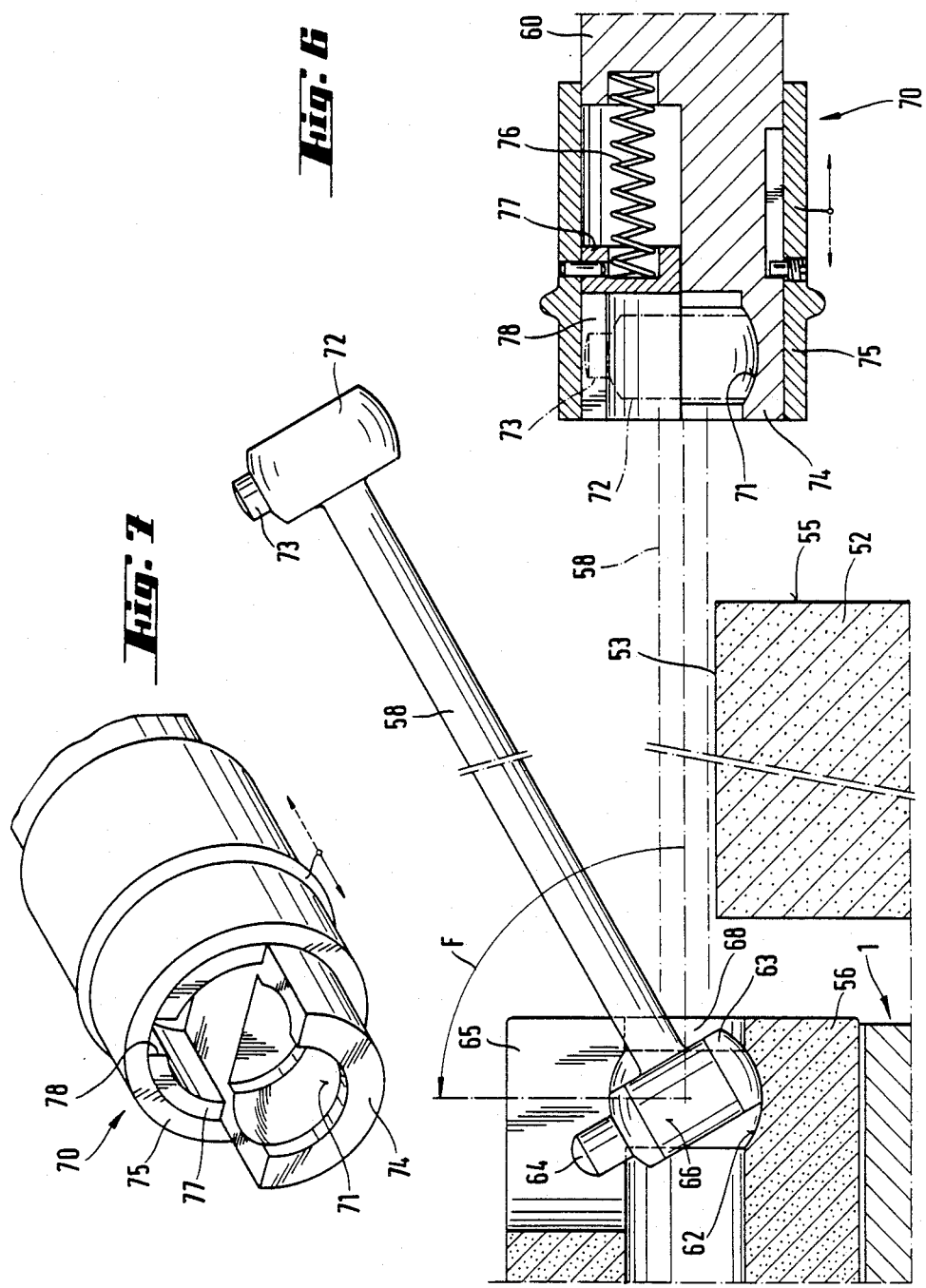

BEARING UNIT FOR CARRYING ROLLERS OF A HORIZONTAL FURNACE AND A HORIZONTAL FURNACE FOR GLASS SHEETS

FIELD OF THE INVENTION

This invention relates to a horizontal furnace for heating glass sheets or for treating glass sheets heated to their tempering and/or bending temperature. The furnace comprises a series of carrying rollers driven synchronously in groups. The invention also relates to a bearing unit for a carrying roller in a horizontal furnace of this type.

BACKGROUND OF THE INVENTION

Numerous embodiments of horizontal furnaces of this type are known which are generally distinguished from one another by their devices for coupling and driving of the rollers and by their roller bearings. Known examples of horizontal furnaces of this type are described, for example, in European Patent Publication Nos. 51,539 and 70,244; in German Patent Publication Nos. 2,319,049 and 2,605,303; and in U.S. Pat. Nos. 4,230,475; 4,399,598; and 4,725,300.

In the hot zone of such horizontal furnaces, the carrying rollers or cylinders forming the conveying track usually consist of cylindrical ceramic rods or tubes the end sections of which are brought through the lateral walls of the furnace to the outside of the furnace and which rotate in bearings placed outside the furnace. Rotation of the carrying rollers in bearings placed in a furnace is not possible with known means because temperatures of more than 600° C. prevail there. The carrying rollers are suitably coupled on the outside of the furnace to a drive device and are driven synchronously.

Various embodiments are known for rotating carrying rollers on the outside of the furnace.

According to the teachings of U.S. Pat. No. 4,399,598, metal caps are pressed on the two ends of the ceramic tubes, and each metal cap carries a pin end which rotates in an ordinary ball bearing.

According to the teachings of European Patent Publication No. 51,539, the end sections of the carrying rollers are each mounted on the outside of the furnace in free rotation on two steel rollers placed a short horizontal distance from one another.

Further, according to German Patent Publication Nos. 2,319,049 and 2,605,303, the end zones of the carrying rollers located outside the furnace are placed on belts driven synchronously, and the belts, for their part, slide on planar support surfaces. In the direction of movement of the belts, behind the carrying rollers, are placed stops or stop rollers against which the carrying rollers roll and which assure that the carrying rollers retain their position during the rotation movement. Driving of the carrying rollers is performed by static friction, created under the effect of the weight of the rollers, between the belts in movement and the carrying rollers placed on the belts.

To preserve the optical properties of the glass sheets, the support lines of the rollers should exhibit the smallest possible spacing in the zone of the furnace where the glass sheets reach or exceed their softening temperature. This means that the carrying rollers should have the smallest possible diameter. In practice, carrying rollers are used which have a diameter of 4 to 5 cm, spaced closely together.

As the width of the furnace increases, which is necessary for heating or treating of glass sheets with large dimensions, it becomes more difficult to maintain the high optical quality desired for the glazings. This results from the fact that, as their length increases with an unchanged diameter, the carrying rollers undergo an increasing elastic bending due to their own weight. (In the worst cases, the carrying rollers undergo permanent deformations.) Consequently, the upper generatrices of the carrying rollers are no longer optimally in the same plane, and this more or less uneven support of the glass sheets results in the degradation observed in the surface evenness of the glazings and thus in an alteration of the optical properties.

A glass annealing frame is known from German Patent Publication No. 615,421 in which the roller bearings are placed inside the furnace, but in this type of furnace a notably lower temperature prevails than in a bending-tempering furnace. With known means, it is not possible to remedy the drawbacks described above by placing the bearings of the carrying rollers in the heating enclosure.

OBJECTS OF THE INVENTION

The invention has as its object to obtain a bearing for carrying rollers which, on the one hand, exhibits better rotation properties than known bearings and which, on the other hand, can be used at temperatures significantly higher than the bearings of the prior art. More precisely, the object of the invention is to obtain a heat-resistant bearing which can be mounted inside the furnace itself, so that the free length of the carrying rollers between the two bearings, for an unchanged working width of the furnace, is reduced, a better precision of the support plane is obtained, and, in this way, the risk of an alteration of the optical properties of the glass sheets is reduced.

The invention also has as its object a horizontal furnace for heating of glass sheets the roller bearings of which are mounted on the inside of the furnace and the couplings of the carrying rollers of which to the drive device is performed, not only to permit suitable driving of the rollers, but also to reduce heat losses at the coupling.

SUMMARY OF THE INVENTION

According to the invention, the foregoing objects are achieved by the fact that the bearing unit is formed by a bearing which automatically adapts to the orientation of the roller section and which rests on two supports each exhibiting an essentially point support surface. One support is mounted stationarily and oscillatingly, and the other support is mounted on a planar base so as to be able to pivot and slide around the stationary support. The sliding surface of the bearing is provided with holes supplied with pressurized gas (preferably air) to form a gas film in the rotating clearance between the bearing and the roller section.

The invention achieves a bearing unit in which, thanks to the gas support of the roller, no mechanical contact of the surfaces in movement relative to one another is established. Consequently, no mechanical contact is produced inside the bearing. The constant clearance necessary to form a uniform gas film between the surface of the roller and the surface of the bearing is guaranteed by the bearing support, which is flexible and which automatically adapts to the roller. The support of the bearing at only two points, placed in a straight line perpendicular to the axis of the roller, makes possible, on the one hand, an oscillating movement of the bearing around the line connecting these support points and, on the other hand, a horizontal pivoting movement around the stationary support point. In this way the bearing adjusts in an optimal manner.

This self-adjustment of the bearing makes possible the installation of bearings inside the furnace. When a furnace is being heated, thermal expansions of the materials inevitably occur, which require an adjustment of the bearings. However, it is quite evident that a manual adjustment cannot be made inside a hot furnace.

Further, roller bearing units according to the invention make it possible to shorten considerably the free length of the rollers between two support points for the same useful furnace width. For this reason, the risk of bending of the carrying rollers is considerably lessened. Thus, it is even possible to use carrying rollers of smaller diameter (and therefore in greater number) to increase the number of lines of support of the glass sheets, which reduces the risk of their deformation. If a very close arrangement of the carrying rollers is selected, it is possible, if necessary, to stagger the bearings (i.e., to place the bearings alternately in two neighboring rows).

The invention also proposes a furnace for heating of glass sheets characterized in that, in at least one part of the furnace, the supports of the rollers are placed inside the furnace and consist of gas bearing units the sliding surfaces of which are provided with holes supplied with pressurized gas (preferably air) to form a gas film in the rotating clearance between the bearing and the roller section. The rollers are preferably of a length less than the width of the furnace and are preferably mounted entirely inside it.

According to another advantageous characteristic of the invention, coupling of each roller to a drive shaft placed on the outside of the furnace is obtained by a coupling rod going through the wall of the furnace. The coupling rod has a diameter smaller than the diameter of the roller, and the coupling rod is coupled in a jointed manner to both the drive shaft and the support roller.

A horizontal furnace exhibiting the combination of these characteristics responds in an optimal way to the requirements for a greater optical quality of the glass sheets and, further, makes possible industrial mass production. Costs are considerably reduced because of shortening of the rollers, which are generally made of an expensive raw material. Further, the openings made in the wall of the furnace for driving the rollers are reduced to a minimum. Thus, heat losses are less, and it is possible to obtain a homogeneous profile of temperatures in the furnace.

BRIEF DESCRIPTION OF THE DRAWINGS

Other details and advantageous characteristics of the invention will be described below with reference to the accompanying drawings.

FIG. 3 is a fragmentary perspective view of a continuous furnace for glass sheets comprising carrying rollers mounted to rotate according to the invention.

FIG. 4 is a perspective view of a continuous furnace for glass sheets with the coupling device according to the invention.

FIG. 5 is a perspective view of the coupling device.

FIG. 6 is the device of FIG. 5 at the moment of uncoupling.

FIG. 7 is a detail of the coupling piece of FIGS. 5 and 6.

DETAILED DESCRIPTION OF THE PRESENTLY PREFERRED EMBODIMENTS

Figure 1:
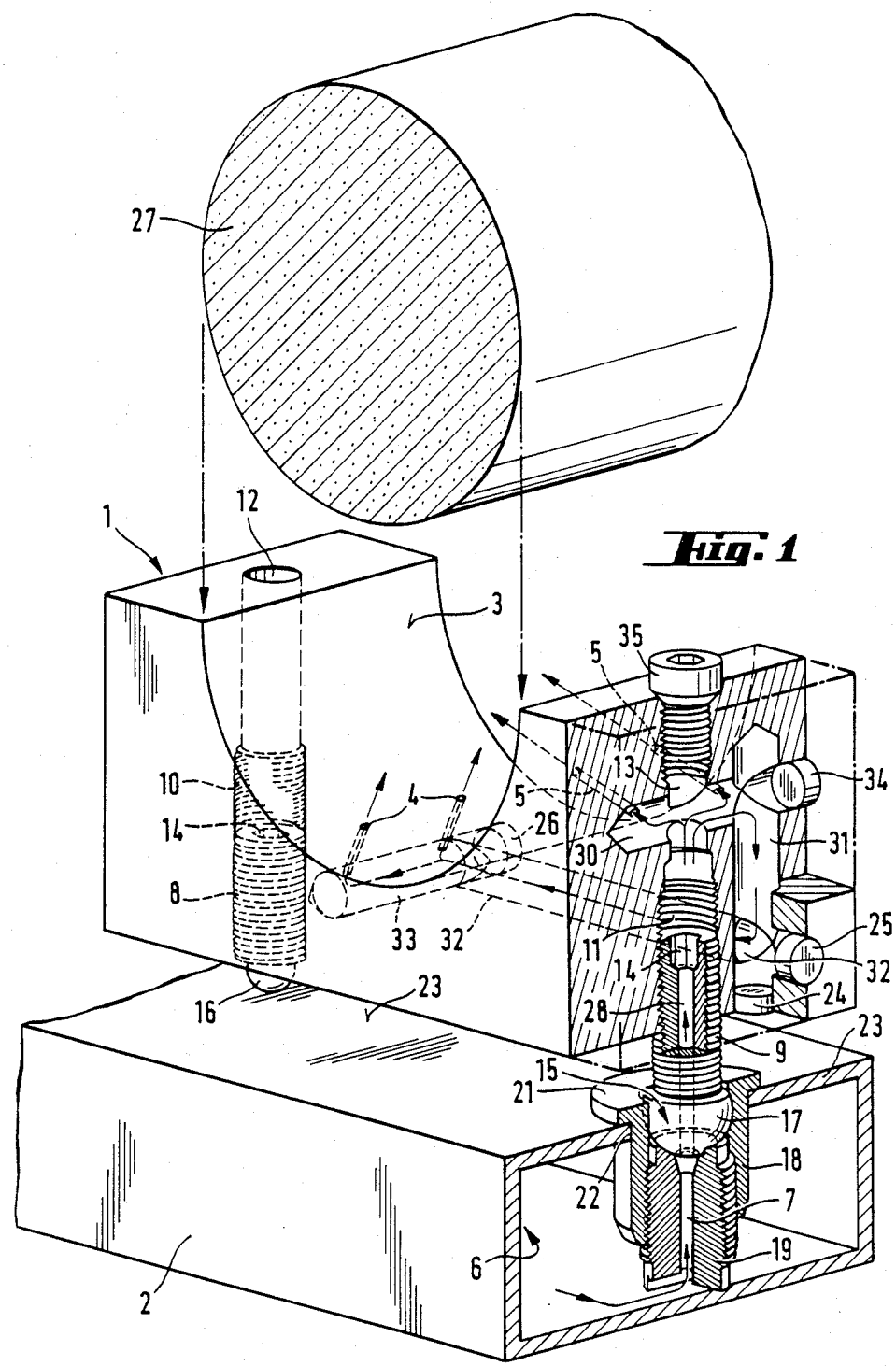
FIG. 1 is an overall perspective view, partially exploded, of a bearing unit for a carrying roller.
Figure 2:
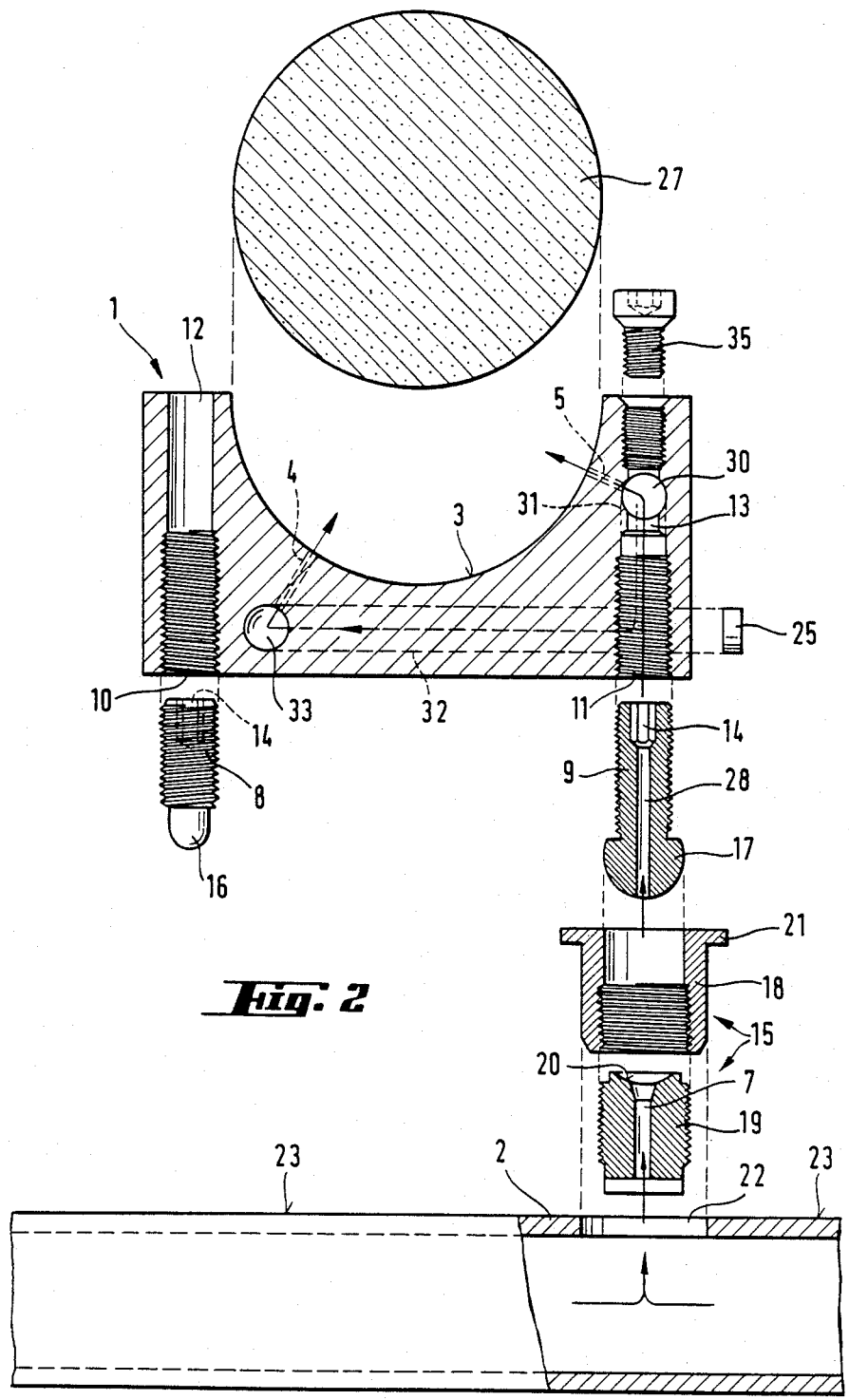
FIG. 2 is a view in exploded section of the bearing unit shown in FIG. 1.

As FIGS. 1 and 2 show in detail, a bearing unit according to the invention comprises a bearing 1 which rests on a hollow rectangular tube 2. The hollow rectangular tube 2 has an upper wall 23 and an interior 6 that serves as a source of compressed air.

The bearing 1 is made of refractory metal or of another refractory material—for example, ceramic. It has the shape of a shell—i.e., a sliding surface 3 supporting a carrying roller 27 has the shape of a half-cylinder with a semicircular base surface. Holes 4, 5, through which compressed air is introduced into the rotating clearance, open in the sliding surface 3.

Flexible support of the bearing 1 is assured by two pins 8, 9 which are threaded so as to be screwable into tapped holes 10, 11. The tapped holes 10, 11 are extended by tapped holes 12, 13. The tapped holes 10, 11 are made in the median vertical plane of the bearing 1, the tapped holes 12, 13 going through the rest of the body of the bearing 1. The pins 8, 9 each exhibit in their upper surface an interior hexagonal hollow 14. The depth of screwing of the pins 8, 9 into the tapped holes 10, 11 can be modified by means of hexagonal wrenches from above, through the tapped holes 12, 13, to perform height adjustment of the bearing 1.

The pin 8 is provided, at its lower end, with a spherical head 16, and the pin 9 is provided at its lower end with a spherical head 17. The spherical head 17, which represents the support surface of the stationary support element (namely, the pin 9), rests in a corresponding spherical cap 15 which is formed by a tapped cylindrical bushing 18 and a threaded cylinder 19 screwed into the tapped cylindrical bushing 18.

The threaded cylinder 19 exhibits, at its upper end, a bearing surface 20 (see FIG. 2) having the shape of a hollow spherical segment which works with the support surface of the spherical head 17. Laterally spherical head 17 is guided by the inside wall of the tapped cylindrical bushing 18.

The pin 9, which forms the stationary support of the bearing 1, can also perform, in the spherical cap 15, angular oscillation movements around the spherical head 17 in all directions. The tapped cylindrical bushing 18 is provided, at its upper end, with a shoulder 21. The tapped cylindrical bushing 18, with the threaded cylinder 19, is inserted in an opening 22 made in the upper wall 23 of the hollow rectangular tube 2, the shoulder 21 resting on the upper wall 23.

The pin 8, with the spherical head 16, forms the support of the bearing 1 that is able to both pivot and slide. The spherical head 16 rests on the planar surface of upper wall 23 of the hollow rectangular tube 2.

Intake of gas (for example, air) in the rotating clearance formed by the sliding surface 3 and the surface of the section of the carrying roller 27 turning in the bearing 1 is assured by the hollow rectangular tube 2 through the pin 9. The threaded cylinder 19 is provided with an axial bore 7, and the pin 9 is provided with an axial bore 28 for this purpose.

On the inside of the bearing 1 the tapped hole 13 is perpendicular to and crosses a first transverse blind bore 30. The two holes 5, coming out into the sliding surface 3 of the bearing 1, communicate with the first transverse blind bore 30. Also in communication with the first transverse blind bore 30 is a vertical blind bore 31 which extends parallel to the tapped hole 13 and which, for its part, is in communication with a longitudinal blind bore 32. The longitudinal blind bore 32 opens into a second transverse blind bore 33, with which the two holes 4, coming out into the sliding surface 3 of the bearing 1, communicate. The first transverse blind bore 30, the vertical blind bore 31, the longitudinal blind bore 32, and the second transverse blind bore 33 are closed by plugs 34, 24, 25, and 26, respectively. The tapped hole 13 is closed at its upper end by a screwed plug 35 which can be removed when a height adjustment of the pin 9 is to be made. This system of bores makes possible the supplying of compressed air to the rotating clearance.

FIG. 3 shows a horizontal furnace 38 having carrying rollers 39 and a lateral wall 41. FIG. 3 also shows how the free length of the carrying rollers 39 can be reduced if the bearing units described above are placed inside the furnace as heat-resistant bearings. For this purpose, along the lateral walls of the horizontal furnace 38 are placed hollow rectangular tubes 2 of refractory steel. The hollow rectangular tubes 2 are each supplied with compressed air by a supply pipe 40. Bearings 1 as described above are placed on the hollow rectangular tubes 2.

The carrying rollers 39 are brought to the outside of the horizontal furnace 38, on one side of it, by corresponding openings 42 provided in the lateral wall 41. A gear wheel 44 is fastened to the corresponding end zone 43 of each carrying roller 39. The gear wheels 44 are moved in rotation by a chain 46 driven by a motor 45. The chain 46 is kept in position by a planar base 47 on which it slides.

The carrying rollers 39 may each, for example, consist of a cylinder or a tube made of ceramic.

Generally it suffices for the compressed air admitted into the hollow rectangular tubes 2 to be at ambient temperature. In this way it is also possible to cool more or less strongly the bearings 1 and the sections of the carrying rollers 39 mounted on the bearings 1. However, when importance is attached to a particularly homogeneous temperature curve inside the furnace, the compressed air admitted into the hollow rectangular tubes 2 can be preheated to a desired temperature.

FIG. 4 is a fragmentary view of a horizontal furnace 5 comprising a coupling device according to an embodiment of the invention. The horizontal furnace 50 consists of an upper part 51 having lateral walls 54, 55 and a lower part 52. The upper part 51 can be raised along a plane of separation 53. When the horizontal furnace 50 is closed, the lateral wall 54 does not exhibit an opening, while the lateral wall 55 exhibits, at a distance from support rollers 56 and at the height of the plane of separation 53, holes 57 by which coupling rods 58 go through the lateral wall 55.

Inside the horizontal furnace 50 are placed bearings 1 of the gas bearing type functioning at high temperature. The bearings 1 in the form of shells rest on hollow rectangular tubes 2 placed along the length of the furnace parallel to lateral walls 54, 55. The hollow rectangular tubes 2 serve to supply compressed air to the bearings 1. For this purpose, they receive compressed air through supply pipes 40. The compressed air escapes through the holes 4, 5 made in the sliding surfaces 3 of the bearings 1 to form a gas film.

The support rollers 56 are made of heat-resistant material, for example of a ceramic material, and can be solid or hollow.

As shown in detail in FIGS. 5 to 7, the coupling rods 58 are connected in a jointed manner, on the one hand, to the support rollers 56 and, on the other hand, on the outside of the horizontal furnace 50, to a drive shaft 60. For this purpose, each support roller 56 exhibits at one of its ends a hollow in the shape of a spherical cup 62 in which is placed a spherical segment 63 fastened to the corresponding coupling rod 58. Each spherical segment 63 is provided with a drive pin 64 oriented perpendicularly to the axis of the corresponding coupling rod 58 and engaged in a slot 65, oriented along a radial of the corresponding coupling rod 58.

Each spherical segment 63 comprises two cylindrical segments 66 placed symmetrically so that their generatrices are parallel to the axis of the corresponding drive pin 64. The radii of the cylindrical segments 66 may correspond to the radius of a bore 68 oriented along the axis of the corresponding support roller 56. Alternatively, the radii of the cylindrical segments 66 may be slightly smaller than the radius of the bore 68.

To loosen the coupling rod 58 of a support roller 56, the coupling rod 58 must undergo a rotation of 90° in the direction of an arrow F (FIG. 6) in the plane formed by the axis of the coupling rod 58 and the drive pin 64. In this position, the generatrices of the cylindrical segments 66 are parallel to the axis of the support roller 56, and the spherical segment 63 can be removed through the bore 68.

To fasten, or remove, a coupling rod 58 on the corresponding support roller 56, it is necessary previously to lift the upper part 51 of the furnace and detach the other end of the coupling rod 58 from the corresponding drive shaft 60. Connection of the coupling rod 58 with the corresponding drive shaft 60 is obtained thanks to a coupling piece 70 at the end of the drive shaft 60. The coupling piece 70 comprises a hollow 71 in the form of a spherical cup in which is placed a spherical segment 72 located at the drive end of the coupling rod 58 and provided with a drive pin 73.

As may be seen in FIG. 6, the hollow 71 is located in a half-cylinder 74 at the end of the coupling piece 70 so that, by swinging, it is possible to remove the coupling rod 58 from the coupling piece 70 when the segment 72 is in the position represented there. A slide 75 in the form of a sleeve is mounted to move at the end of the drive shaft 60. Against the action of a spring 76, the slide 75 is shoved into its end position represented in FIG. 6, a position in which the cylindrical segment 72 is fastened in the hollow 71. A sleeve 77 fastened to the slide 75 contains a slot 78 in which the drive pin 73 of the coupling rod 58 engages.

The bearing 1 of the support roller 56, resting on the hollow rectangular tube 2, is identical with that described with reference to FIG. 1.

Such a horizontal furnace is intended for heating of glass sheets for their shaping and/or tempering, especially for production of automobile glazings.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by letters patent of the United States is:

1. A bearing unit for a carrying roller in a horizontal furnace for heating glass sheets for their bending or their tempering, said bearing unit comprising a bearing which automatically adapts to the orientation of a roller journaled therein and which rests on two pins each having a substantially point support surface, a first one of said two pins being mounted stationarily and oscillatingly and the second one of said two pins being mounted on a planar base so as to be able both to pivot and to slide around said first pin, said bearing having a sliding surface provided with holes which, to form a gas film in the rotating clearance between said bearing and the roller, are supplied with gas by means for supplying a pressurized gas.

2. A bearing unit according to claim 1 wherein each of said substantially point support surfaces of said two pins has the shape of a spherical head.

3. A bearing unit according to claim 2 wherein said spherical head of said first pin is mounted to rotate in a spherical cup.

4. A bearing unit according to claim 3 wherein said means for supplying a pressurized gas comprise an axial bore in said first pin and an axial bore in said spherical cup which is in communication with a tube.

5. A bearing unit according to claim 1 wherein said two pins are mounted on a hollow rectangular tube which, in use, brings in compressed gas, which has a planar upper wall which forms the mounting surface for said second pin, and in which said first pin is installed.

6. A bearing unit according to claim 1 wherein said two pins are adjustable relative to said bearing.

7. A bearing unit according to claim 6 wherein said bearing is provided, in the extension of tapped holes receiving said two pins, with passage holes through which the depth of said two pins is adjustable.

8. A horizontal furnace for heating of glass sheets for their bending and/or their tempering, said horizontal furnace comprising carrying rollers driven synchronously, said carrying rollers being journaled in bearing units according to claim 1, said bearing units being installed inside the furnace and being mounted on hollow tubes placed along the lateral walls of the furnace, by which they are supplied with compressed gas.

9. A horizontal furnace according to claim 8 wherein said carrying rollers have a length less than the width of the furnace.

10. A horizontal furnace according to claim 8 wherein coupling of a carrying roller to a corresponding drive shaft, placed on the outside of the furnace, is obtained by means of a coupling rod going through a lateral wall of the furnace, exhibiting a smaller diameter than that of the corresponding carrying roller, and being coupled in a jointed manner both to the corresponding drive shaft and to the corresponding carrying roller.

11. A horizontal furnace according to claim 10 wherein:
(a) each coupling rod is provided at its two ends with cylindrical segments placed in spherical cups and the corresponding carrying roller and in the corresponding drive shaft and
(b) drive pins transmit the rotation movement.

12. A horizontal furnace according to claim 11 wherein said cylindrical segments comprise two segments the generatrices of which are parallel to the axis of the corresponding drive pin, the diameter of said segments being less than or equal to the diameter of a bore at the front end of the corresponding carrying roller.

13. A horizontal furnace according to claim 10 wherein:
(a) a spherical cup acting with a cylindrical segment is placed in a half-cylinder at the end of a coupling piece and
(b) a slide in the shape of a hollow cylinder is mounted to move, said slide serving to fasten said cylindrical segment in said cup and being kept in position by a spring.

14. A horizontal furnace according to claim 10 wherein said support rollers are made of ceramic.

* * * * *